(12) United States Patent
Kusnezow

(10) Patent No.: US 6,627,845 B2
(45) Date of Patent: Sep. 30, 2003

(54) METHOD AND APPARATUS FOR LASER MACHINING USING A LASER BEAM

(75) Inventor: Gennadij Kusnezow, Langenhagen (DE)

(73) Assignee: LPKF Laser & Electronic AG, Garbsen (DE)

( * ) Notice: Subject to any disclaimer, the term of this patent is extended or adjusted under 35 U.S.C. 154(b) by 0 days.

(21) Appl. No.: 10/237,990

(22) Filed: Sep. 10, 2002

(65) Prior Publication Data
US 2003/0066822 A1 Apr. 10, 2003

(30) Foreign Application Priority Data
Sep. 10, 2001 (DE) .......................................... 101 44 521

(51) Int. Cl.[7] ............................................... B23K 26/36
(52) U.S. Cl. .................................................. 219/121.73
(58) Field of Search ........................ 219/121.6, 121.67, 219/121.72, 121.73, 121.77, 121.83, 121.85

(56) References Cited

U.S. PATENT DOCUMENTS 6,489,589 B1 * 12/2002 Alexander
6,531,677 B2 * 3/2003 Arai et al.

FOREIGN PATENT DOCUMENTS

| DE | 32 17 226 | 11/1982 |
|----|-----------|---------|
| DE | 43 41 553 | 4/1995 |
| DE | 29618298 U1 | 10/1996 |

* cited by examiner

Primary Examiner—Samuel M. Heinrich
(74) Attorney, Agent, or Firm—Crowell & Moring LLP

(57) ABSTRACT

A method for laser machining and an apparatus (1) for performing the inventive method to equalize spot areas (2) of a laser beam (3), which are dissimilar in the direction of their main axes (X, Y). For this purpose, a second laser beam (4) is decoupled from the initially common laser beam (3) by a splitting element (8) and through reflection from a reflector (7) is coupled into the optical axis (9) by a combining element (8). Due to the inclined arrangement of the reflector (7), so that a line (N) normal to its surface forms an angle of 0 to 90° with the main axes (X, Y), the spot area (10) of the second laser beam (4) is rotated relative to the first spot area (2) such that as a result of the superimposition, the total area of the superimposed spot areas (2, 10) will be symmetrical about a given point. As a result, machining using the laser beams (3,4) forming the spot areas (2, 10) is independent of the direction of advancement of the laser machining device.

9 Claims, 1 Drawing Sheet

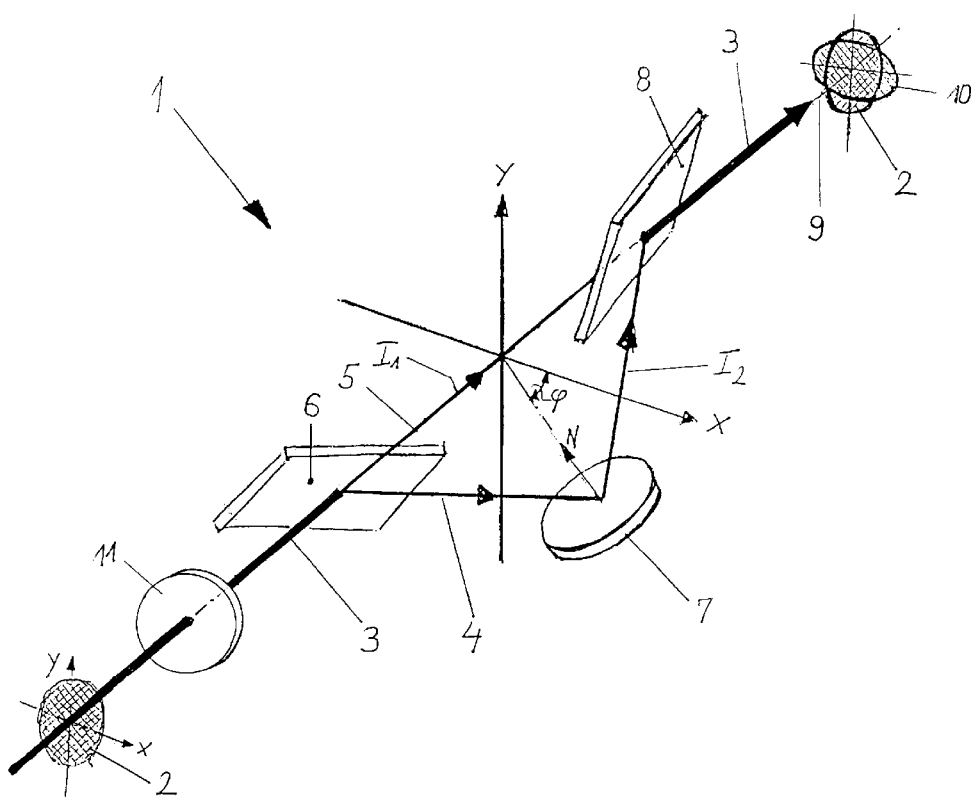

METHOD AND APPARATUS FOR LASER MACHINING USING A LASER BEAM

BACKGROUND OF THE INVENTION

The invention relates to a method for laser machining using a laser beam to correct a spot area that deviates from an ideal shape, especially a shape which is symmetrical around a given center point. The invention further relates to an apparatus for carrying out this method.

In the machining of workpieces using a focused laser beam, the spot geometry in the focal plane on the workpiece is decisive for the machining quality in practice. If, as frequently occurs in practice, this spot area deviates from an ideal circular shape (e.g., if the laser spot has an oval shape due to different optical aberrations of the laser source and/or the focusing optics), then the resulting machined surface depends on the direction of advancement because of the different dimensions of the spot area of the laser beam in the direction of the two main axes. For instance, an oval laser spot that is guided along a circular trajectory leads to an oval machining zone and thus to unsatisfactory machining results.

Due to the continuously increasing requirements to be met by laser machining, particularly in view of miniaturization, the influences of errors caused by the oval spot area must be corrected. This involves substantial costs, however.

For instance, the deviation caused by the spot area can be compensated through correction values in the control program to be able to adjust, for instance, a corrected trajectory as a function of the direction of advancement of the laser spot. Such a solution requires substantial control complexity, however, especially since the occurring spot area error can prove to be different in each laser device. As a result, the correction values must first be determined and must be correspondingly taken into account with each change in the control program.

It is also feasible to use an optical element to make the laser beam rotatable relative to the workpiece, such that the position of the main axes of the spot area can be kept constant relative to the advance direction. This solution has the drawback, however, that it requires mechanical actuators, which in practice significantly slow down the machining rate even if only one optical element disposed in the beam path is moved for the rotary motion of the laser beam.

SUMMARY OF THE INVENTION

It is an object of the invention to provide a method that will bring about a simple correction or point symmetry of the spot area of a laser machining device.

Another object of the invention is to provide a laser spot correcting method which can be performed without any mechanical actuators or changes in the control program.

It is also an object of the invention to provide an apparatus for carrying out the method of the invention.

These and other objects are achieved in accordance with the present invention by providing a method for laser machining by directing a laser beam against a workpiece to form a laser spot area, wherein an initial laser spot area formed by the laser which deviates from an ideal shape symmetrical about a point, is corrected; said method comprising superimposing a second laser spot area on the initial laser spot area, wherein said second laser spot area is rotated about its optical axis relative to the initial laser spot area by splitting the laser beam into first and second laser beams that form the initial and second spot areas, respectively; reflecting the second laser beam from a reflector which is inclined relative to main axes (X, Y) of the initial laser beam and which has a reflecting surface oriented such that a line normal to said surface forms an angle between 0 and 90° with the main axes (X, Y) of the laser beam; and thereafter recombining the second laser beam with the initial laser beam to form a common laser beam of corrected shape.

In accordance with a further aspect of the invention, the objects are achieved by providing an apparatus for use in laser machining to correct a spot area of an initial laser beam that deviates from an ideal shape symmetrical about a point, said apparatus comprising a reflector which is inclined relative to main axes (X, Y) of the initial laser beam and which has a surface such that a line normal to said surface forms an angle between 0 to 90° with said main axes; a beam splitter for splitting off a second laser beam from the initial laser beam and directing the second laser beam toward said reflector, whereby said second laser beam is rotated relative to the optical axis of the initial laser beam; and a combining element for recombining the rotated second laser beam with the initial laser beam to produce a common laser beam which forms a corrected laser spot area.

BRIEF DESCRIPTION OF THE DRAWING

The invention will be described in further detail hereinafter with reference to illustrative preferred embodiments shown in the accompanying drawing, which is a schematic representation of an apparatus according to the invention for carrying out the method of the invention.

DETAILED DESCRIPTION OF PREFERRED EMBODIMENTS

The invention thus provides a method in which a second spot area is superimposed onto the first spot area relative to which it is rotated about the optical axis. To accomplish this, the laser beam is initially split into a first laser beam and a second laser beam forming the second spot area and after reflection from a reflector, which is inclined relative to the main axes and the surface normal of which forms an angle of 0 to 90° with the main axes, is combined into a common laser beam 3. This causes a second, particularly a congruent spot area to be superimposed on the first spot area, the second spot area being rotated about the optical axis relative to the first spot area. In this manner, a total area which is symmetrical about a central point, is delimited by the superimposed spot areas, such that the machining of a workpiece is largely independent of the direction of advancement of the device. This eliminates, in particular, correction measures for the control program as well as actuators. As a result, the device can be implemented at low cost.

In a particularly simple embodiment of the method according to the invention, the second laser beam is decoupled in a direction divergent from the planes of the main axes of the first spot area such that the second spot area is rotated about the optical axis by 90° relative to the first spot area. This is a simple way to superimpose the two spot areas, so that their respective main axes are rotated by 90° relative to one another. The superimposed spot area exhibits only minor deviations from an ideal circle, which in practice provides substantially improved accuracy in the laser's zone of influence.

The invention also provides an apparatus that can be used in laser machining for correcting a spot area of a laser beam, which deviates from an ideal shape in the direction of two main axes. This desirable result is attained according to the invention by a splitting element for splitting the second laser beam from the beam path of the common laser beam in the direction of a reflector, which is inclined relative to the main axes and the surface normal of which forms an angle of 0 to 90° with the main axes, and a combining element for combining a second laser beam with a second spot area that is rotated about an optical axis with the first laser beam to form the common laser beam.

Through the superimposition of the two spot areas, especially if the two spot areas are congruent, a total area is delimited, which is symmetrical about a central point and thus is largely independent of the direction of advancement of the machining device. Machining of a workpiece is thereby substantially facilitated by using the device. In particular, correction measures for the control program as well as actuators for a pivotable arrangement of the laser beam can be eliminated. The second laser beam is split from the initially common beam path of the first laser beam and guided in the direction of the reflector. From there, the laser beam reaches the combining element which combines the first and the second laser beam in the direction of the optical axis to form the common laser beam. The deflection of the second laser beam divergent from the main axes achieves a rotation of the mutually divergent axis of the spot area, such that the two spot areas of the first and the second laser beam are superimposed.

A further, particularly advantageous modification of the present invention is obtained by designing the reflector as a highly reflective planar mirror to ensure a largely loss-free and wear-free deflection of the laser beam.

A particularly advantageous embodiment of the invention is obtained if the line normal to the surface of the reflector forms a 45° angle with the main axes. As a result, the second spot area is rotated by 90° relative to the first spot area, so that the resulting super define a surface boundary which is substantially symmetrical about a point. The superimposed spot area is thus optimally suited for machining a workpiece because it is substantially independent of the advance direction during laser machining.

The splitting or combining element can be formed by a half-silvered or semi-transparent mirror. In another, particularly practice-oriented embodiment of the invention, however, the beam splitter and/or the combining element comprise(s) a polarizer. This largely prevents a possible power loss associated with decoupling and coupling the second laser beam. The total intensity of the two laser beams thus corresponds approximately to the intensity of the original beam prior to decoupling the second laser beam.

Another, particularly practice-oriented modification is obtained if the device can be pivoted about the optical axis. This makes it possible to adjust the relative angle between the superimposed spot areas to the desired degree through rotation or fixation at different angular positions relative to the optical axis. In particular, a 90° angle by which the spot areas are superimposed to form an overall area which is symmetrical about a point, can already be adjusted at the factory.

A further, particularly advantageous embodiment of the invention is also obtained if the device is provided with a delay plate arranged in the beam path in front of the splitting element. This delay plate can be adjusted particularly through rotation about the optical axis, such that a corresponding intensity of the two laser beams can be adjusted even if the light is unpolarized or only partially polarized.

The invention permits various embodiments. To further illustrate its basic principle, an embodiment is depicted in the drawing and will now be described with reference to a perspective view of an apparatus 1 according to the invention. The drawing shows a spot area 2 of a common laser beam 3. Corresponding to the oval geometry of the spot area 2, the spot has different power and/or angular distributions of laser beam 3 in the direction of its main axes X and Y. Due to this asymmetric power distribution in the focusing plane, the spot area 2 has to be corrected for laser machining by means of laser beam 3, since the use of the laser would otherwise produce different results as a function of the advance direction.

To correct spot area 2, laser beam 3 is split into a first laser beam 5 following an optical axis 9 and a second laser beam 4 by means of a splitting element 6 constructed as a polarizer, and after reflection from a reflector constructed as a mirror 7, the second laser beam 4 is coupled back into the beam path 3 of the first laser beam along an optical axis 9 by means of a combining element 8, which again is embodied as a polarizer. Reflector 7 is arranged relative to main axes X, Y such that a line N normal to the surface of reflector 7 forms an angle $\phi$ with the main axis X. This angle $\phi$ results in a relative rotation of a second spot area 10 in relation to spot area 2 of the first laser beam 3 with the angle $2\phi$. In the example shown, where angle $\phi=45°$, this results in a point-symmetrical superimposition of the two spot areas 2, 9, which are thereby rotated relative to one another by 90°.

The intensities $I_1$, $I_2$ of the two laser beams 3, 4 substantially correspond. To adjust angle $\phi$, device 1 can be rotated about the optical axis 9, so that any superimposition of the two spot areas 2, 10 can be adjusted. In the beam path, in front of the splitting element 6, a delay plate 11 is arranged, which can be adjusted, particularly through rotation about the optical axis 9, such that a corresponding intensity $I_1$, $I_2$ of the two laser beams 4, 5 can be adjusted even if the laser light is unpolarized or only partially polarized.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method for laser machining by directing a laser beam against a workpiece to form a laser spot area, wherein an initial laser spot area formed by the laser which deviates from an ideal shape symmetrical about a point, is corrected; said method comprising superimposing a second laser spot area on the initial laser spot area, wherein said second laser spot area is rotated about its optical axis relative to the initial laser spot area by splitting the laser beam into first and second laser beams that form the initial and second spot areas, respectively; reflecting the second laser beam from a reflector which is inclined relative to main axes (X, Y) of the initial laser beam and which has a reflecting surface oriented such that a line normal to said surface forms an angle between 0 and 90° with the main axes (X, Y) of the laser beam; and thereafter recombining the second laser beam with the initial laser beam to form a common laser beam of corrected shape.

2. A method according to claim 1, wherein the second laser beam is split from the initial laser beam in a direction which diverges from planes of the main axes (X, Y) of the initial spot area in such a way that the second spot area is rotated about the optical axis of the initial laser beam by 90° relative to the initial spot area.

3. An apparatus for use in laser machining to correct a spot area of an initial laser beam that deviates from an ideal shape symmetrical about a point, said apparatus comprising a reflector which is inclined relative to main axes (X, Y) of the initial laser beam and which has a surface such that a line normal to said surface forms an angle between 0 to 90° with said main axes; a beam splitter for splitting off a second laser beam from the initial laser beam and directing the second laser beam toward said reflector, whereby said second laser beam is rotated relative to the optical axis of the initial laser beam; and a combining element for recombining the rotated second laser beam with the initial laser beam to produce a common laser beam which forms a corrected laser spot area.

4. An apparatus according to claim 3, wherein the reflector is a highly reflective plane mirror.

5. An apparatus according to claim 3, wherein said line normal to the reflector surface forms a 45° angle with said main axes (X, Y).

6. An apparatus according to claim 3, wherein the beam splitter or the combining element is equipped with a polarizer.

7. An apparatus according to claim 6, wherein both the beam splitter and the combining element are equipped with polarizers.

8. An apparatus according to claim 3, wherein the apparatus can be rotated about the optical axis of the common laser beam.

9. An apparatus according to claim 3, further comprising a delay plate arranged in the beam path in front of the beam splitter.

* * * * *